United States Patent
Tormasov

(10) Patent No.: US 7,509,369 B1
(45) Date of Patent: Mar. 24, 2009

(54) BALANCING SHARED SERVERS IN VIRTUAL ENVIRONMENTS

(75) Inventor: Alexander Tormasov, South San Francisco, CA (US)

(73) Assignee: SWsoft Holdings, Ltd. (BM)

(*) Notice: Subject to any disclaimer, the term of this patent is extended or adjusted under 35 U.S.C. 154(b) by 1678 days.

(21) Appl. No.: 10/298,441

(22) Filed: Nov. 18, 2002

Related U.S. Application Data

(63) Continuation-in-part of application No. 10/193,944, filed on Jul. 11, 2002, now abandoned.

(60) Provisional application No. 60/304,707, filed on Jul. 11, 2001.

(51) Int. Cl.
  *G06F 15/16* (2006.01)
(52) U.S. Cl. .................................... 709/201
(58) Field of Classification Search ............... 709/201; 718/1
  See application file for complete search history.

(56) References Cited

U.S. PATENT DOCUMENTS

| | | | | |
|---|---|---|---|---|
| 5,365,606 | A * | 11/1994 | Brocker et al. | 719/331 |
| 5,870,550 | A * | 2/1999 | Wesinger et al. | 709/218 |
| 5,905,990 | A * | 5/1999 | Inglett | 707/200 |
| 6,098,093 | A * | 8/2000 | Bayeh et al. | 709/203 |
| 6,205,413 | B1 * | 3/2001 | Bisdikian et al. | 709/224 |
| 6,263,361 | B1 * | 7/2001 | Hoyer et al. | 709/203 |
| 6,560,613 | B1 | 5/2003 | Gylfason et al. | |
| 6,597,956 | B1 * | 7/2003 | Aziz et al. | 709/208 |
| 6,618,736 | B1 | 9/2003 | Menage | |
| 6,640,278 | B1 * | 10/2003 | Nolan et al. | 709/203 |
| 6,662,221 | B1 * | 12/2003 | Gonda et al. | 709/223 |
| 6,691,165 | B1 * | 2/2004 | Bruck et al. | 709/227 |
| 6,714,980 | B1 * | 3/2004 | Markson et al. | 709/226 |
| 6,754,716 | B1 | 6/2004 | Sharma et al. | |
| 6,779,016 | B1 * | 8/2004 | Aziz et al. | 709/201 |
| 6,907,421 | B1 | 6/2005 | Keshaw et al. | |
| 6,922,832 | B2 * | 7/2005 | Barnett et al. | 718/1 |
| 7,028,305 | B2 * | 4/2006 | Schaefer | 719/310 |
| 2002/0038301 | A1 * | 3/2002 | Aridor et al. | 707/10 |
| 2002/0073134 | A1 * | 6/2002 | Barnett et al. | 709/105 |
| 2002/0078174 | A1 * | 6/2002 | Sim et al. | 709/219 |
| 2002/0116531 | A1 * | 8/2002 | Chu | 709/246 |
| 2002/0143954 | A1 * | 10/2002 | Aiken et al. | 709/227 |
| 2003/0130833 | A1 * | 7/2003 | Brownell et al. | 703/23 |

OTHER PUBLICATIONS

User's Guide, Connectix, Virtual PC for Macintosh Version 4.0, Dec. 2000.*
www.apache.org, from Aug. 2000, printed Jul. 21, 2006.*

* cited by examiner

*Primary Examiner*—Larry D Donaghue
*Assistant Examiner*—Ajay Bhatia
(74) *Attorney, Agent, or Firm*—Bardmesser Law Group

(57) ABSTRACT

A system for organization of a service which provides computer hosting services to users is based on a virtual environment placed at the disposal of each user. The virtual environment is installed at an automated cluster of computers in a data center. Each virtual environment appears as a full service computer to the user.

38 Claims, 5 Drawing Sheets

BALANCING SHARED SERVERS IN VIRTUAL ENVIRONMENTS

REFERENCE TO RELATED APPLICATIONS

This application is a continuation-in-part of U.S. patent application Ser. No. 10/193,944, filed on Jul. 11, 2002, now abandoned, which claims the benefit of U.S. Provisional Patent Application No. 60/304,707, filed on Jul. 11, 2001, which is incorporated herein by reference in its entirety.

TECHNICAL FIELD

This invention relates to techniques for balancing the workload of network services and servers on the basis of Virtual Environments with common effective sharing of resources.

BACKGROUND

The need for a computer hosting service providing began with the onset of linking computers together. Data centers enabling shared access to a plurality of computers were the first to provide for the hosting of services to an outside computer user. Traditionally, these data centers used mainframe computers which allowed end users to obtain required data storage services to facilitate such applications as ticket booking offices at multiple railway stations.

Computer hosting services became widespread with the development of the Internet as a highly suitable environment for server access. The growing demand for high-quality computer hosting, quality channels, and computers with corresponding hosting services installed, resulted in a tremendous growth of data centers and their remote hosting services.

The providing of a remote computer hosting service is based on a client-server concept, as described in *Operating Systems: a Design-oriented Approach* by Charles Crowley. Remote hosting service to client computers means that server and data storage services are physically separated from client computers and are linked to client computers by the Internet. The typical data center service represents one server with shared data files accessible by special network protocols, e.g., the World Wide Web (WWW) service protocol, i.e., http. Such special network protocols are designed to function within a distributed network of client computers and network servers, where the network of computers is not as compact as a local computer network.

Serving a special network protocol requires a WWW server, stable Internet and computer access, and non-interrupted service functioning. Dedicated Internet access lines, surplus power supply, cooling, fire and damage protection, etc. are usually found at the data centers, due to the substantial financial investment and technical expertise required. Typically, data centers provide the following services and equipment for their customers:

a dedicated computer with connection to the Internet which is fully operated by the client computer;

installation of the client computer at the data center; and some limited computer resources for a particular service.

Specially trained staff and tailored software are usually required to support the above-mentioned remote hosting service. To meet the needs of customers, data centers usually sell their portion of the remote hosting support service to a separate division or an independent company which then provides the web-hosting service. This gives the client the opportunity to fill in the provider's web server with the client's contents.

Web-hosting companies typically send users their own web-servers as they are, without the possibility of modification. Certain difficulties emerge when executable CGI files, or "scripts", typically written in interpreted Perl-a-type language, are launched. The CGI files are executed at a server based on user query arguments, and are generally utilized for dynamic generation of web-page contents.

Most active servers generate their web pages by user query arguments. Nevertheless, incorrectly written applications may cause problems with versions of script language interpreters used, web-server versions, and web-server configuration versions; as well as server malfunction, unauthorized access and loss of data security.

One of the basic problems of prior art web-hosting techniques is the quality of access. The quality of access problem has many facets, including the quality of network connection and related fault tolerance level, the availability of the servicing computer, the fault tolerance of the hub and router supplementary equipment, and the non-interrupted functioning of the service-program that contacts the client computer.

Data centers provide much assistance with respect to the quality of access problem, as they readily utilize redundant network resources, standby power supplies, constant system monitoring, and air conditioners, among other things. Nevertheless, the computer which is executing the server-program is the focus for quality servicing. In cases of overload and excessive client requests to a server, the capacity of the computer executing the server program may be insufficient This problem of insufficient capacity is particularly true for servers which haphazardly generate pages of dynamic content, such as news portals which use interpretive language text script generation of requested page of dynamic content.

The problem of insufficient computer capacity may be dealt with in several ways. Obviously, a more powerful computer may be utilized to process hosting service requests. But simply adding more capacity may not be cost efficient, as computer costs rise dramatically with capacity upgrades.

Another solution to the computer capacity problem is the use of a cluster of computers to correlate hosting service requests. This approach to solving the problem of insufficient computer capacity utilizes an algorithm, program, or device to distribute hosting service requests between the clustered computers. Load balancing is critical when a cluster of computers is used, i.e., distribution of requests for hosting service, so as to guarantee the best possible utilization of computer resources. Programs to implement the distribution of hosting service requests are usually called load balancers; while the programs to process hosting service requests are called computer-clusters or farm-servers, e.g., a web-farm for an http protocol (see R. S. Engelschall "Load balancing your web site: Practical approaches for distributing http traffic," Web Techniques Magazine, 3(5), May 1998; Allon, et al. Jul. 23, 1996 U.S. Pat. No. 5,539,883).

In a cluster of computers, each client has an address to which they are trying to connect which is linked to a load balancer. For instance, for a server with an http protocol (WWW), the load balancer could function at a DNS level and give out different IP addresses to clients who have requested the same symbol address, i.e., URL. Typically, though, clients connect to a server via a load balancer program that analyzes both the requests and the farm and redirects the request to one of the servers.

There are several different options for request-processing computer selection for the load balancer, including: consecutive, least loaded, type of request, and contents of transmitted data, among others. The final variant is formed at the last stage of the farm design or installation of a server.

There remains, however, a need in the art for a system and method to balance servers to effectively process and respond to a request for hosting services.

SUMMARY

To resolve the problem of balancing servers to effectively respond to a hosting services request, the system and method of the present invention suggests the use of a cluster of automatically configured computers and a system of virtual environments optionally integrated with a distributed file system, where the cluster of computers becomes a platform for providing a hosting service.

Specifically, the system and method of the present invention relates to balancing servers on the basis of a system of virtual environments with common effective resources sharing. The system and method of the present invention is organized to respond to requests for hosting services wherein each user has access to a virtual environment which is installed at a cluster of computers in a data center. Each virtual environment represents a full-service computer which has an operating system with a unique administrative root user, a file system, internet protocol address, and configurable parameters, but with no dedicated storage or other hardware resources. Each virtual environment is launched at a different cluster node and is created for each user. One cluster may contain several virtual environment sets which supply different services and users of a data center, or each virtual environment may support a set of services to act as a part of a common shared server.

Each virtual environment in the system of virtual environments of the present invention provides full-service to each user. Each virtual environment is accessible through the network and provides the services of an operating system. In comparison to similar software provided by IBM, VMware and other software vendors, the virtual environment of the present invention emulates no hardware functionality. Rather, the virtual environment of the present invention represents a personal well-protected "machine" that possesses an operating system and functions as an independent workstation or a server as shown in FIG. 1. Several virtual environments may function at one computer simultaneously. Each end user perceives the virtual environment as his/her personal server where the end user is able to obtain super user rights, install programs, and add other users. Virtual environments emulating the same computer are absolutely isolated, with a user within one virtual environment unaware of other active virtual environments and their processes.

The virtual environments which are part of the present invention allow for the installation of any programs which may be launched in an underlying operating system, e.g., its own web-servers with CGI scripts and dynamic modules, mail-servers, ftp-servers, RealAudio/Video-servers, X-server with remote access, a sshd-server. Users may also adjust their own firewall and install any application compiled from source texts. In other words, the users may do whatever is executable at a separate computer connected to the Internet. Thus, the services provided by the virtual environment of the present invention far exceed those provided by traditional web hosting services.

From the viewpoint of users and administrators, virtual environments represent highly uniform remote computers which are simple to install, support, and formalize. A large number of the highly uniform virtual environments can be efficiently controlled, with such management of virtual environments requiring less time for user training and routine operations. Thus, several computers with a set of launched virtual environments provide a standardized service hosting environment with complete end user access.

A unified service, called load balancer, is used to manage all of the servers in the cluster. The load balancer receives all of the connections from the clients and distributes them by information such as TCP/IP address, TCP/IP port number, and other parameters or client data. Further, the load balancer uses balancing rules to determine the computer hosting service which has to respond to requests and redirect the computer hosting service request to the virtual environment which is providing the requested hosting service. The balancing rules used by the load balancer may consist of either static or dynamic information. The static information, such as TCP/IP address or TCP/IP port number, is known at the time of connection. Dynamic information is determined after connection by the client data depending on the protocol type, e.g., DNS name, URL, host field, http protocol request, or SMTP/FTP protocol user name.

The load balancer may be placed at one cluster node together with the virtual environments or the load balancer may be placed at a separate computer. The answer to a client request for hosting services may or may not be mediated by the load balancer. The address of each virtual environment which provides supporting services may be public and accessible from the Internet, or the address for each virtual environment may be private and accessible only via a load balancer. In case of a private address, the response to client request from the appropriate virtual environment is sent via the load balancer which should have a public IP address.

The load balancer uses either a symmetric or an asymmetric scheme to select a virtual environment. Load distribution among the servers is determined according to the balancing rules and current cluster node loading. A symmetrical scheme utilizes uniform functioning of all of the servers of the shared server. The asymmetrical scheme utilizes some dedicated servers processing only some classes of requests. The load balancer service itself may be load-balanced and placed simultaneously at several cluster nodes to improve the fault tolerance level of the system as a whole and reduce the load of the computer on which the balancing program is installed.

For the cluster of servers, the use of a load balancer provides the advantage of improved fault tolerance level and

BRIEF DESCRIPTION OF THE DRAWING FIGURES

DESCRIPTION OF THE EMBODIMENTS

The present invention describes a system and method for balancing of servers on the basis of virtual environments with common effective resources sharing intended for data center clients.

The virtual environments of the present invention provide each user access to a full-service computer which has an operating system with a unique administrative root user, a file system, internet protocol address, and configurable parameters, but with no dedicated storage or other hardware resources.

Figure 1:
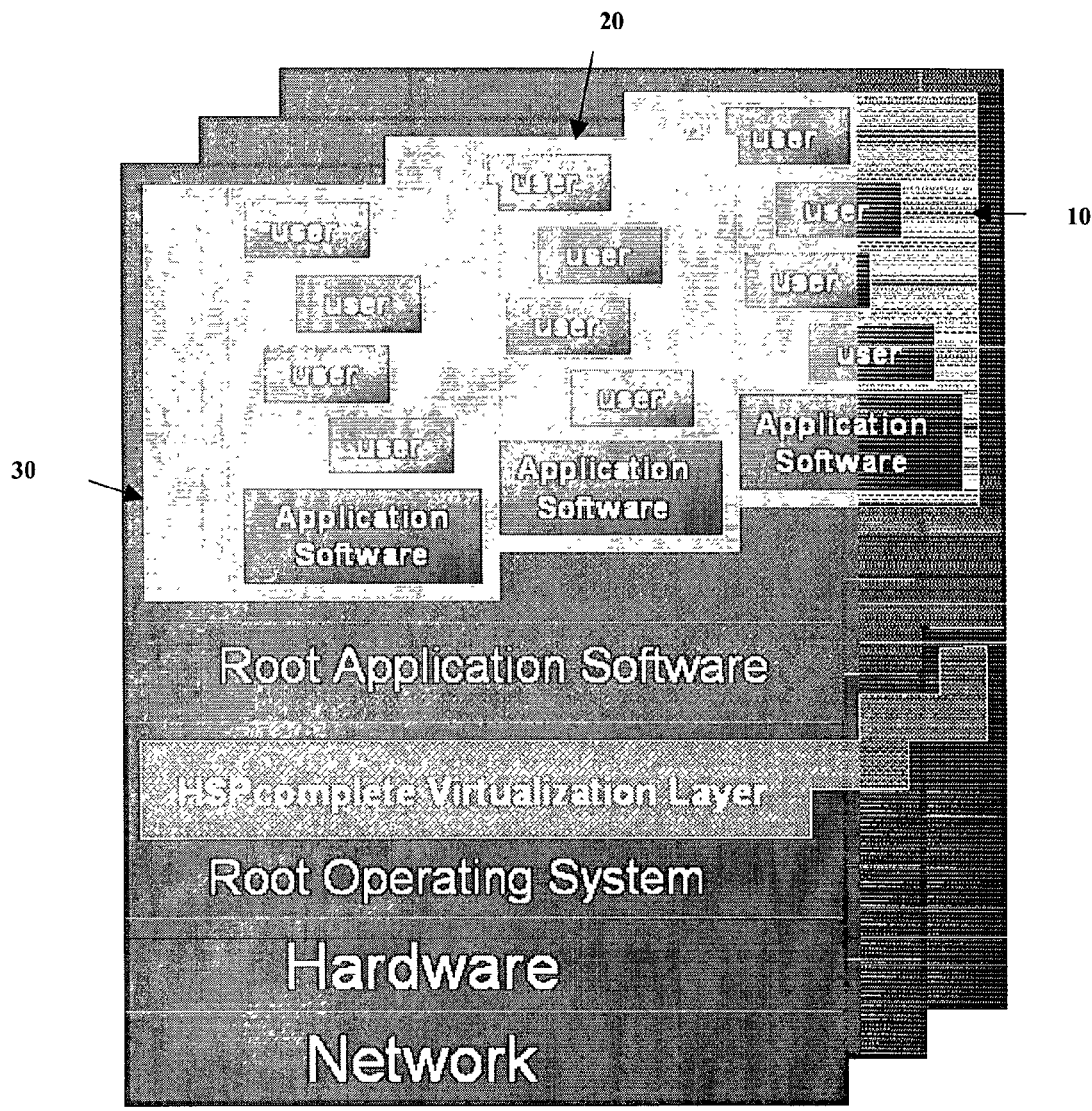
FIG. 1 illustrates a virtualization of operating system technique.

In comparison to similar software provided by IBM, VMware and other software vendors, the virtual environment of the present invention does not emulate functionality of any hardware. As shown in FIG. 1, each virtual environment 10, 20, 30 represents a personal well-protected "machine" that possesses an operating system and functions as an independent workstation or a server. Several virtual environments may function at one and the same computer simultaneously and independently. The end user views the virtual environment as his/her personal server where he/she is able to obtain super-user rights, install programs, introduce additional users, etc. Virtual environments of the same computer are completely isolated, such that a user within one virtual environment is unaware of other active virtual environments and their processes.

The virtual environment of the present invention allows the installation of any program that may be launched in an underlying operating system, e.g., web-servers with CGI scripts and dynamic modules, mail-servers, ftp-servers, RealAudio/Video-servers, X-servers with remote access sshd-servers. Users may also adjust their own firewall and install any application compiled from source texts. In other words, users may perform all functions which are executable at a separate computer connected to the Internet, far surpassing the services of traditional web hosting.

From the viewpoint of users and administrators, the virtual environments of the present invention represent highly uniform remote computers which require minimal installation, support, and configuration. The high uniformity of the virtual environments facilitate the implementation of efficient controls to manage large numbers of equivalent virtual environments. Management of the virtual environments requires less time for training and routine operations. Thus, a group of computers with a set of launched virtual environments provides a totally accessible standardized service hosting environment to end users.

Figure 2:
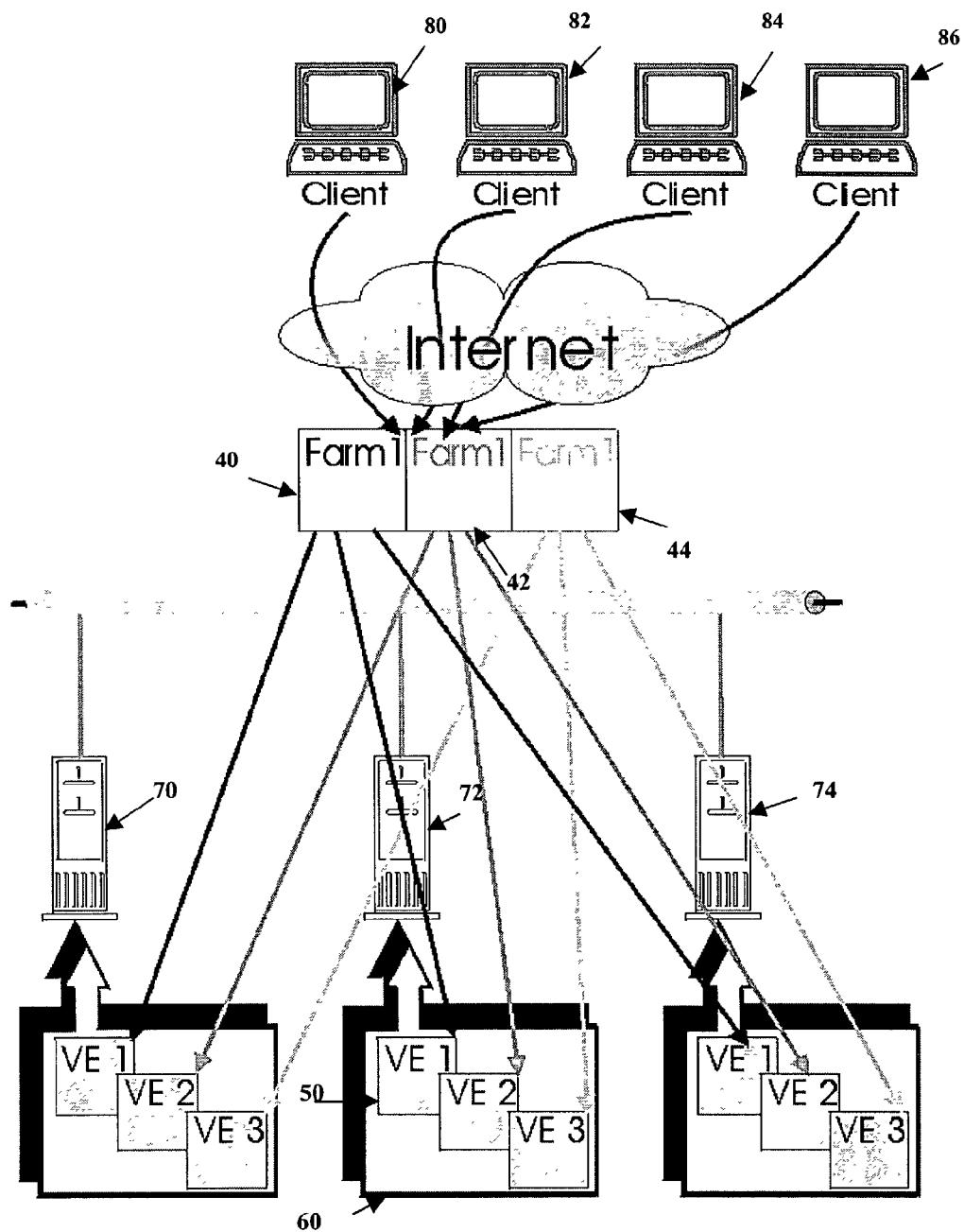
FIG. 2 illustrates the use of several farms of servers inside one Virtual Environment cluster to share resources.

The placement of services inside virtual environments creates a farm of servers 40 for request processing as illustrated in FIG. 2. Each virtual environment 50, as a service carrier, is located at a separate cluster node 60. The load balancer, i.e., a program for request receiving and distribution, is run at either a dedicated computer or a cluster node, subject to the choice of balancing technique and the general client balancer/server farm interplay.

As shown in FIG. 2, the cluster may contain a few virtual farms 40, 42, 44, which are connected to the client computers 80, 82, 84, and 86 by the Internet. The virtual farms 40, 42, and 44, being isolated at the virtual environment level, would share the same hardware. Thus, load-balancing service of the same physical equipment 70, 72, 74 may be offered to several client computers 80, 82, 84, 86 of a data center.

The load balancing algorithm takes account of the current server loading, both in general and of its farm. Minimum guaranteed service, expected from each farm server, might be provided by regular distribution and quality provision virtual environment support (e.g., Service Level Agreement and Quality of Service).

The load balancing program receives connections, analyzes client connection data contents and then carries out balancing on the basis of the balancing rules. [Wensong Zhang "Linux Virtual Server for Scalable Network Services", Ottawa Linux Symposium 2000; Brendel, et al, Jun. 30, 1998, U.S. Pat. No. 5,774,660; and Brendel, Jan. 30, 2001, U.S. Pat. No. 6,182,139.] The load balancing program operates both static and dynamic data, determined by the contents under transmission.

Static parameters constitute the first class of parameters and are represented by TCP/IP connections data [Network Working Group "Request for Comments: 1180 A TCP/IP Tutorial"], i.e., a port number or IP address known prior to the connection. These parameters are not mandatory and there are algorithms for an alternate choice of server.

Figure 5:
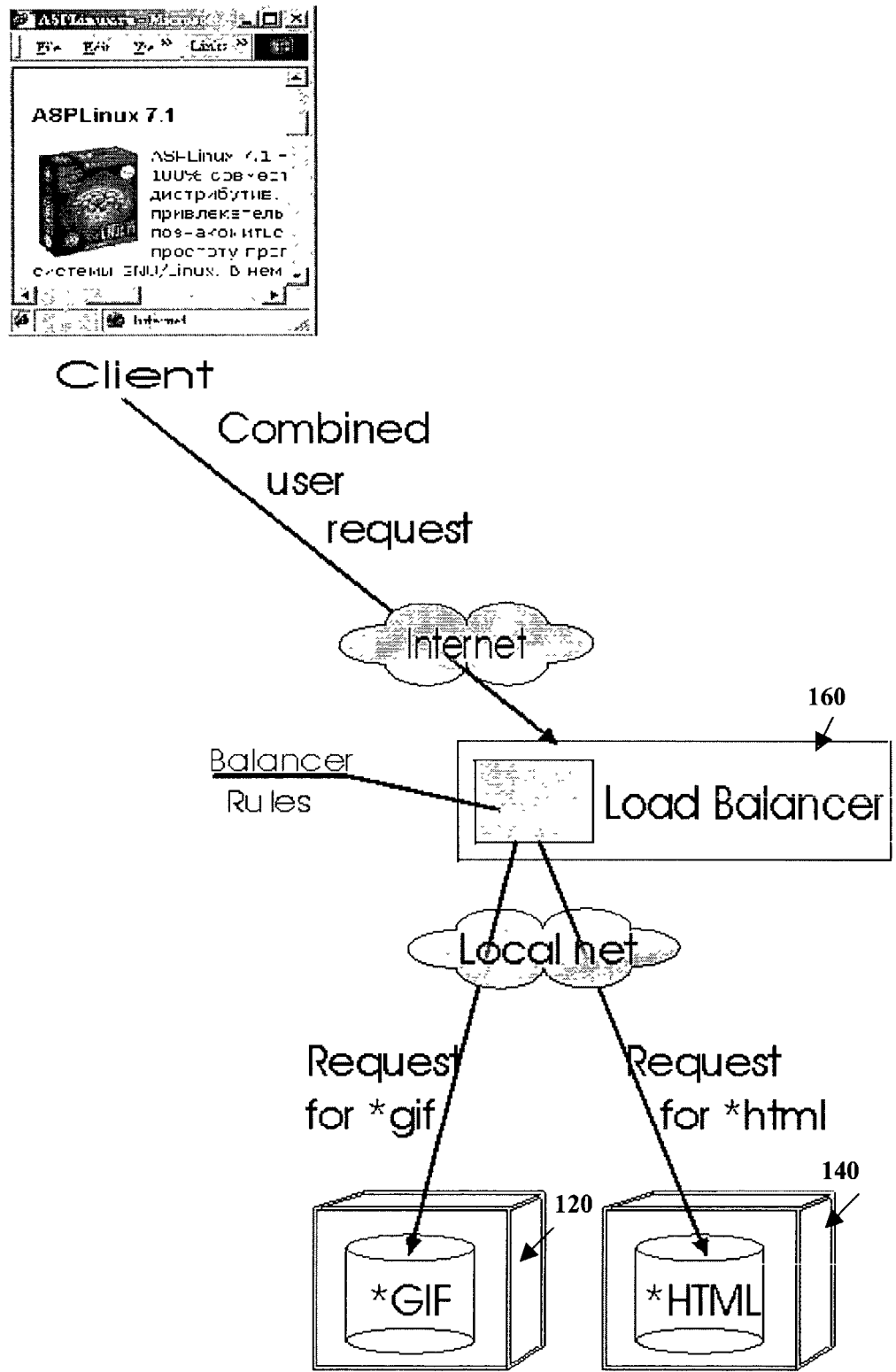
FIG. 5 illustrates a load balancer in asymmetric mode (a web-page request wherein the load balancer distributes a client request by its contents, i.e., by file-image and file-text).

The second class is represented by data requiring preliminary analysis. As shown in FIG. 5, for example, assume all the "*.gif" files are to go to one server farm and all the "*.html" files to the other, according to the load balancing rules. To forward such a request, the load balancer 160 first receives client data, (e.g., a request text being sent by the client to a port of the farm for connection to a WWW server), then reads its contents. In this case, the load balancer 160 first locates the URL inside the request text, then reads the URL and correlates it with the appropriate rules. After this procedure, a server farm 120, 140 is chosen to receive the request as shown in FIG. 5. This type of load balancing usually implies an asymmetric scheme of server distribution, i.e., some servers are allowed to process only strictly appointed requests. Under symmetric distribution, any server may process a request, and the choice of a server is determined by external factors such as current loading and sequence [Rege, Mar. 18, 1997, U.S. Pat. No. 5,612,897]. Nevertheless, both schemes, when used at a virtual environment platform, analyze not only a virtual environment applicant, but the general loading of the cluster node where the virtual environment is located as well.

Analysis of the request contents goes beyond an HTTP protocol, used for connection to WWW servers. Access to FTP or SMTP servers may require different approaches, e.g., a user name claimed at the connection may serve as a key element for the choice of the processing server. A description of the above-mentioned protocols can be found in Network Working Group "Request for Comments: 2616 Hypertext Transfer Protocol—HTTP/1.1"; Network Working Group "Request for Comments: 765 File Transfer Protocol"; and Network Working Group "Request for Comments: 1725 Post Office Protocol—Version 3".

Figure 4:
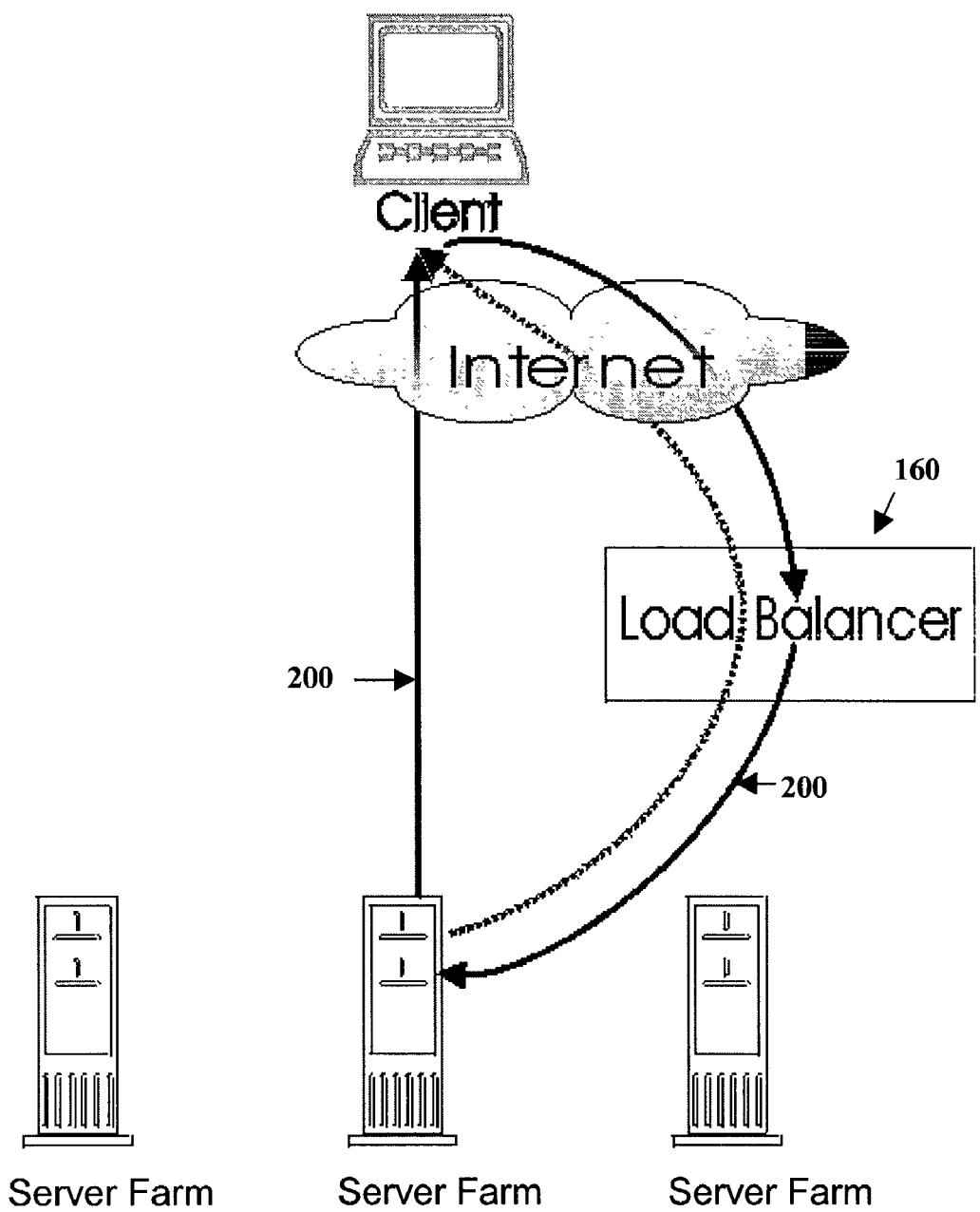
FIG. 4 illustrates different schemes of load balancer functioning (solid line for a direct answer to client, dotted line for an answer with load balancer as a mediator)

Answers 200 of a server farm to a particular request may differ depending on the mechanism selected. As shown in FIG. 4, the answer from a server farm may either go to the load balancer 160 to be forwarded to the client or the answer may be sent independently of the load balancer 160.

In the first case, the server needs information about the client who sent the request to forward the TCP packets on the client's behalf, e.g., an IP address to be used directly by the client, with no load balancer mediation.

Figure 3:
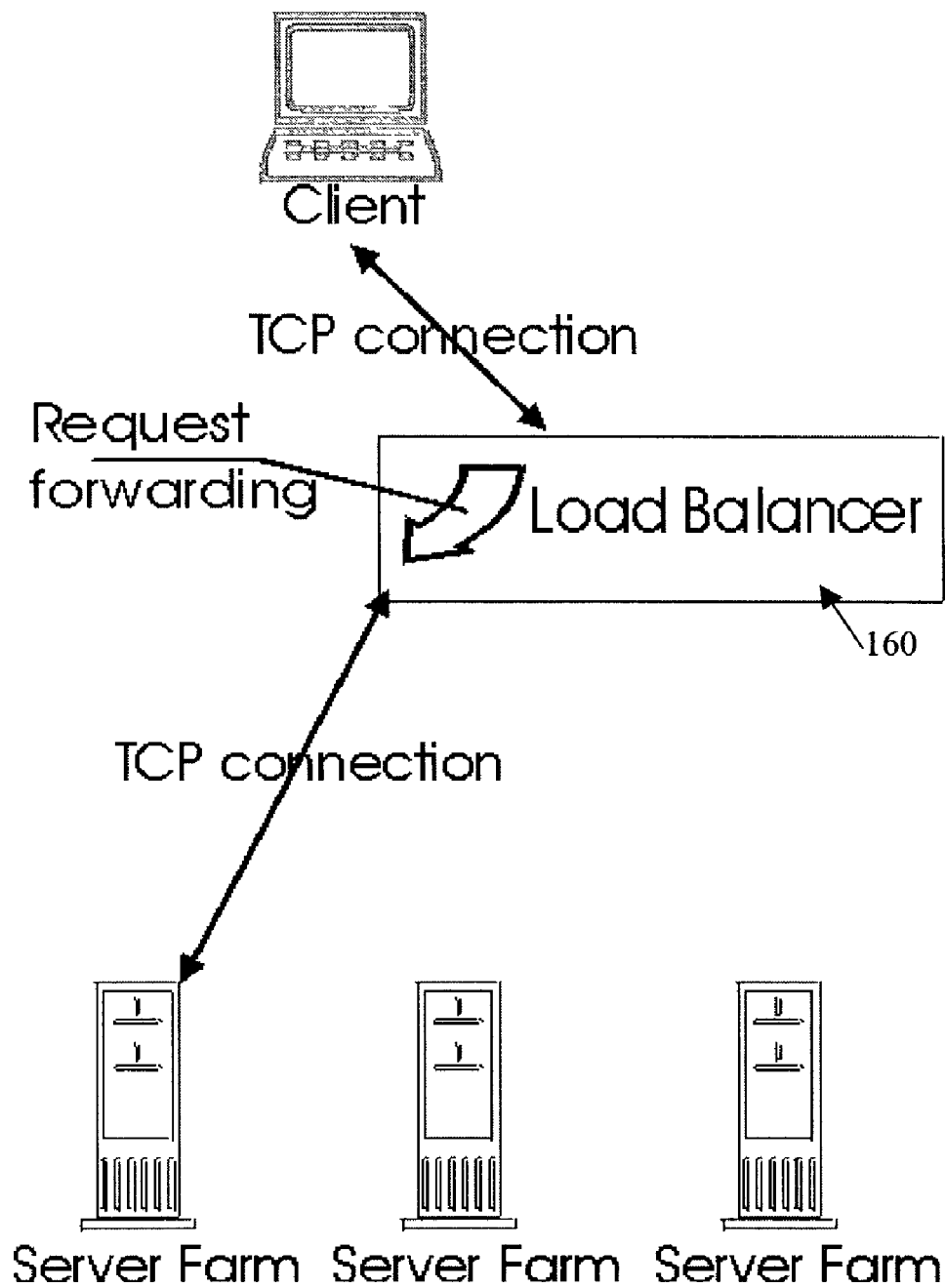
FIG. 3 illustrates request forwarding via load balancer to a farm server, whereby the client is connected to the load balancer only.

In the second case shown in FIG. 3, a farm server computer is unaware of the real client's address and sends the answer to the load balancer, which lists all the connections to forward packets to the client. In this situation, the load balancer is the only means to contact server farms directly, and is the sole source of information for their addresses. Thus, it makes the addresses local and inaccessible from the Internet and eliminates the need for public Internet addresses for the farm's servers.

The program for the load balancer is either placed at a computer (which may or may not be a node cluster), or consists of several modules, which are placed at different computers or node clusters. Such placement at different computers or node clusters reduces overloading of the computer where the load balancer is installed, as the load balancer sometimes analyzes network data at a level of extremely high complexity. In other words, the loading level of the load balancer itself can be balanced. Having more than one program also increases the fault tolerance level of the system as a whole, because disconnection or computer inaccessibility with load balancer in place will not influence the service.

The main difference of the present invention against others is the ability to handle a set of service farms on a set of computers where virtual environments efficiently share resources of computers between different members of different farms and load balancers can make a server selection based on information about current total hardware workload due to all virtual environments workloads.

While the present system has been disclosed according to its preferred and alternate embodiments, those of ordinary skill in the art will understand that other embodiments have been enabled by the foregoing disclosure. Such other embodiments shall be included within the scope and meaning of the appended claims.

What is claimed is:

1. A system for providing computer hosting services comprising:
    a computer cluster including a plurality of physical cluster nodes, each node representing a stand-alone physical computer; and
    a plurality of virtual execution environments running on the computer cluster,
    wherein each virtual execution environment includes the following operating system components: a unique administrative root user, a file system, and an IP address,
    wherein the plurality of virtual execution environments are aggregated into a plurality of virtual execution environment sets, each set functioning as a server farm and providing services to the remote users, and different virtual execution environment sets provide different types of services to the remote users,
    wherein each physical cluster node includes virtual execution environments that belong to different sets, and
    wherein the computer cluster provides hosting services to owners of the server farms.

2. The system of claim 1, further comprising a load balancer for managing the cluster nodes,
    wherein the load balancer receives connections from the users and distributes the connections based on any of TCP/IP address, TCP/IP port number, and information obtained from data transmitted by the user.

3. The system of claim 2, wherein the load balancer is located at several cluster nodes.

4. The system of claim 2, wherein the load balancer is located on a dedicated cluster node.

5. The system of claim 4, wherein the load balancer shares the dedicated cluster node with at least one virtual execution environment.

6. The system of claim 2, wherein the load balancer uses balancing rules to determine processing requirements and selects a virtual environment for responding to a request for service, and
    wherein the request for service is redirected to the selected virtual environment.

7. The system of claim 6, wherein a response to a request for service from a user is processed using load balancing mediation.

8. The system of claim 6, wherein the load balancer, when selecting a virtual execution environment for responding to the request for service, uses symmetric balancing, and determines load distribution using balancing rules and information about a current loading of a cluster node.

9. The system of claim 6, wherein the balancing rules include any of static and dynamic information,
    wherein the static information includes any of TCP/IP address and TCP/IP port number, and
    wherein the static information is known prior to the connection.

10. The system of claim 9, wherein the dynamic information is determined after connection based on information transmitted by the user, and
    wherein the dynamic information depends upon a protocol type.

11. The system of claim 10, wherein the dynamic information includes any of DNS name, URL, host field of http protocol request, SMTP/FTP protocol user name, and current workload information.

12. The system of claim 10, wherein the load balancer, when selecting a virtual execution environment for responding to the request for service, uses an asymmetric balancing scheme, and determines load distribution using balancing rules and information about a current loading of a cluster node.

13. The system of claim 1, wherein the virtual execution environments act as a single logical common shared server that provides at least one service to the users.

14. The system of claim 1, wherein an IP address of each virtual execution environment that supports a hosting service is a public IP address.

15. The system of claim 1, wherein an IP address of each virtual execution environment that supports a hosting service is a private IP address of a virtual execution environment that responds to the request for service through the load balancer.

16. The system of claim 1, wherein an IP address of each virtual execution environment that supports a hosting service is a private IP address of a virtual execution environment that responds to a request for service via dedicated servers.

17. The system of claim 1, wherein the virtual execution environments have no dedicated hardware resources.

18. The system of claim 1, wherein the different types of services include any of providing GIF files, video files, email, CGI scripts and HTML files.

19. The system of claim 1, wherein the different types of services include serving HTTP requests directed to different URLs.

20. The system of claim 1, wherein the different types of services include serving FTP requests directed to different URLs.

21. The system of claim 10, wherein the different types of services provided by the server farms include serving user requests directed to different domains.

22. A method for providing computer hosting services comprising:
    forming a computer cluster from a plurality of physical cluster nodes, each node representing a stand-alone physical computer; and
    running a plurality of virtual execution environments on the computer cluster,
    wherein each virtual execution environment includes the following operating system components: a unique administrative root user, a file system, and an IP address,
    wherein the plurality of virtual execution environments are aggregated into a plurality of virtual execution environment sets, each set functioning as a server farm and providing services to the remote users, and different virtual execution environment sets provide different types of services to the remote users,
    wherein each physical cluster node includes virtual execution environments that belong to different sets, and wherein the computer cluster provides hosting services to owners of the server farms.

23. The method of claim 22, further comprising activating a load balancer for managing the cluster nodes, wherein the load balancer receives connections from the users and distributes the connections based on any of TCP/IP address, TCP/IP port number, and information obtained from data transmitted by the user.

24. The method of claim 23, wherein the load balancer is located at several cluster nodes.

25. The method of claim 23, wherein the load balancer is located on a dedicated cluster node.

26. The method of claim 25, wherein the load balancer shares the dedicated cluster node with at least one virtual execution environment.

27. The method of claim 23, wherein the load balancer uses balancing rules to determine processing requirements and selects a virtual execution environment for responding to a request for service, and wherein the request for service is redirected to the selected virtual execution environment.

28. The method of claim 27, wherein a response to the request for service is processed using load balancer mediation.

29. The method of claim 27, wherein the load balancer, when selecting a virtual execution environment for responding to the request for service, uses symmetric balancing, and determines load distribution using balancing rules and information about a current loading of a cluster node.

30. The method of claim 27, wherein the load balancer, when selecting a virtual execution environment for responding to the request for service, uses an asymmetric balancing scheme, and determines load distribution using balancing rules and information about a current loading of a cluster node.

31. The method of claim 27, wherein the balancing rules include any of static and dynamic information, wherein the static information includes any of TCP/IP address and TCP/IP port number, and wherein the static information is known prior to the connection.

32. The method of claim 31, wherein the dynamic information is determined after connection based on information transmitted by the user, and wherein the dynamic information depends upon a protocol type.

33. The method of claim 31, wherein the dynamic information includes any of DNS name, URL, host field of http protocol request, SMTP/FTP protocol user name, and current workload information.

34. The method of claim 22, wherein the virtual execution environments act as a single logical common shared server that provides at least one service to the users.

35. The method of claim 22, wherein an IP address of each virtual execution environment that supports a hosting service is a public IP address.

36. The method of claim 22, wherein an IP address of each virtual execution environment that supports a hosting service is a private IP address of a virtual execution environment that responds to the request for service through the load balancer.

37. The method of claim 22, wherein an IP address of each virtual execution environment that supports a hosting service is a private IP address of a virtual execution environment that responds to a request for service via dedicated servers.

38. The method of claim 22, wherein the virtual execution environments have no dedicated hardware resources.

* * * * *